Patented Apr. 30, 1935

1,999,382

UNITED STATES PATENT OFFICE 1,999,382

REFRACTORY MATERIAL FOR USE IN METAL CASTINGS AND PROCESS FOR MAKING THE SAME

Arthur S. Weygandt, Cleveland Heights, Ohio, assignor to The Grasselli Chemical Company, Cleveland, Ohio, a corporation of Delaware No Drawing. Application June 13, 1932, Serial No. 617,046

6 Claims. (Cl. 25—156)

The present invention relates to refractories for use in casting metals and consists in novel compositions in which aluminous material has been incorporated in a silicate bonded sand refractory.

Linings of apparatus for handling molten, particularly ferrous metals, molds for casting metals and similar equipment which comes in contact with molten metals are sometimes made of sand bonded by a soluble silicate. Such refractories suffer from the disadvantage that they deteriorate or lose strength on prolonged storage in moist atmosphere and that they are relatively easily broken.

I have found that hydrated aluminum oxide reacts slowly with soluble silicates, such as potassium or sodium silicate, particularly at elevated temperature, and that such a reaction product when formed within a refractory composition strengthens the bond between the silicate and the sand particles forming the refractory proper.

In the performance of my invention, I mix a hydrated aluminum oxide with sand and a soluble silicate, shape the mix and bake it and my invention comprises the so obtained refractory, its manner of manufacture and its uses.

The hydrated aluminum oxide compound, which I found particularly useful in making my novel refractories, are natural ores, such as bauxite, bauxite concentrates or other natural products or the residues remaining after extraction of bauxite with sulfuric acid. Such residues contain substantial amounts of hydrated aluminum oxide, up to 30% expressed as $Al_2O_3$, besides some titanium oxide, silica and other acid insoluble material; besides such natural products I can also use partly dehydrated precipitated aluminum hydroxide.

I attribute the beneficial effect of the addition of hydrated aluminum oxide to the reaction product which is formed slowly between the soluble silicate and the aluminum compound, particularly during the process of baking the refractory. In this respect the hydrated aluminum oxide is distinguished from precipitated aluminum hydroxide which reacts too fast, whereas calcined aluminum oxide or clays do not readily react with the silicate.

The advantages of my novel refractories reside in their porosity, improved resistance to moisture and better resistance to the temperature of molten metals, particularly the temperature of molten iron.

In preparing my novel refractories, I mix for instance 5 parts of ground bauxite ore with 84 pounds of silica sand (40 mesh) and 11 parts of sodium silicate solution of 42° Bé. and a ratio of 3.25 $SiO_2$:1$Na_2O$, shape this mixture to the desired form whereby a stiff self-sustaining body is formed, which I then bake as usual in the art of forming silicate bonded refractories. It is advisable in this respect to heat the refractory in the absence of carbon dioxide which otherwise may impair the strength of the bond.

I can vary the amounts of the ingredients within certain limits. The amounts of the hydrated aluminum oxide compound can be varied from about 2 to 15%. Excellent results have been, for instance, obtained with from 2 to 5% of residues from acid extraction of bauxite ore and due to the cheapness of such material, it is particularly adapted for use in my novel refractories.

Silicate solutions of $SiO_2$ to $Na_2O$ ratios between 2:1 and 3.6:1 are, due to their adhesive properties, particularly adapted for use in my invention. The amounts of sodium silicate used in preparing my novel refractories must also be controlled within certain limits to produce a resistant refractory. From about 3 to 7 parts of sodium silicate solids for 100 parts of total wet mixture were found particularly adapted. Similarly the concentration of the silicate should preferably not be less than about 40° Bé.; when using stronger solutions, I add a certain amount of water to the mix so that the final mixture before baking becomes self-sustaining and can easily be removed from the molding device. I can also add to my compositions small amounts of metal oxides, such as $Fe_2O_3$ or $Cr_2O_3$, which will impart to the refractories a distinctive color.

As prepared by the above process, my novel refractories have, after baking, an initial strength as great and usually greater than similar compositions made without the aluminum compound. After storing for three months in a moist atmosphere, a refractory made simply from sand and sodium silicate has lost most of its original strength and easily crumbles up, whereas my novel refractories have maintained an appreciable portion of their original strength. My novel refractories furthermore do not break up after they have been used many times in contact with the molten metals in operations for which they were designed. My novel refractories are sufficiently porous to allow the escape of gas when in contact with molten iron and this particular property in combination with their strength makes them of special usefulness for linings, molds, etc., as used in connection with casting metals.

I claim:

1. The process of making a porous refractory resistant to moisture and high temperatures which comprises mixing sand and a soluble silicate with a hydrated aluminum oxide, shaping said mixture and baking it.

2. The process of making a porous refractory resistant to moisture and high temperatures which comprises mixing sand with a soluble silicate solution and from 2 to 15% of a hydrated aluminum oxide, shaping said mixture and baking it.

3. In a process of making a porous refractory resistant to moisture and high temperature the step of baking a mixture of an alkali metal silicate and sand in an atmosphere substantially free from $CO_2$.

4. In a process of making a porous refractory resistant to moisture and high temperatures, the step of baking a mixture of an alkali metal silicate, sand, and a hydrated aluminum oxide in an atmosphere substantially free from $CO_2$.

5. A refractory characterized by being porous, resistant to moisture and high temperatures and being composed of sand, a soluble silicate and the reaction product obtained when mixing a hydrated aluminum oxide with sand and silicate and baking the mixture.

6. A refractory characterized by being porous, resistant to moisture and high temperatures and being composed of a mixture of sand, sodium silicate and the reaction product obtained when mixing a bauxite residue with sand and silicate and baking the mixture.

ARTHUR S. WEYGANDT.